Figure 1:
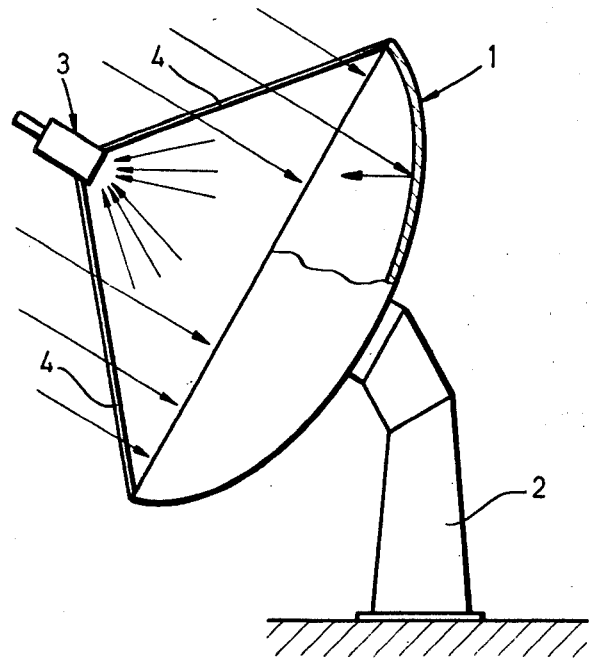

United States Patent [19]

Keller

[11] 4,149,856

[45] Apr. 17, 1979

[54] METHOD AND APPARATUS FOR PRODUCING A GASEOUS FUEL BY MEANS OF SOLAR ENERGY

[76] Inventor: Willy Keller, Hettlingerstrasse 7, 8472 Seuzach, Zurich, Switzerland

[21] Appl. No.: 787,124

[22] Filed: Apr. 13, 1977

[30] Foreign Application Priority Data

Apr. 22, 1976 [CH] Switzerland ............. 59021/76

[51] Int. Cl.² ........................................ B01J 3/00
[52] U.S. Cl. .................................. 48/62 R; 48/73;
48/197 R; 48/202; 126/271
[58] Field of Search ............ 48/202, 209, 210, 197 R,
48/99, 62 R, 73, 77; 126/270, 271

[56] References Cited

U.S. PATENT DOCUMENTS

| | | | |
|---|---|---|---|
| 2,760,920 | 8/1956 | Olsen | 126/270 |
| 3,171,403 | 3/1965 | Drescher | 126/270 |
| 3,868,823 | 3/1975 | Russel et al. | 126/270 |
| 3,993,458 | 11/1976 | Antal | 48/209 |
| 4,000,733 | 1/1977 | Pauly | 126/270 |

Primary Examiner—S. Leon Bashore
Assistant Examiner—George C. Yeung
Attorney, Agent, or Firm—Howard C. Miskin

[57] ABSTRACT

A gaseous fuel is produced, utilizing thermolysis and a water-gas reaction, by heating a piece of carbon through exposure to reflector-focused solar radiation and contacting it with steam. The carbon is at least partially immersed in water within a chamber. A surface portion of the carbon is irradiated by the focused solar radiation through a window in the chamber and through the water and heated to at least 1000° C. A cloud of steam is thus produced in the environment of the heated carbon surface, thereby enabling formation of the gaseous fuel. After being separated from the water, the fuel can be stored indefinitely in a container.

9 Claims, 4 Drawing Figures

METHOD AND APPARATUS FOR PRODUCING A GASEOUS FUEL BY MEANS OF SOLAR ENERGY

This invention relates to a method of producing a gaseous fuel, of the type wherein steam is brought into contact with red-hot carbon, as well as to apparatus intended for this purpose, of the type wherein a piece of carbon is disposed at least partially within a chamber.

Long-term storage of solar energy is of great importance for the supply of energy. Because solar energy is available only irregularly and, normally, not at the most favorable time when it is supposed to be used for heating purposes, it is necessary to store this energy and to tap it when needed. It is known to heat up a heat carrier, e.g., water, with the aid of solar energy and to store the hot water in a large, insulated tank. In the case of relatively short storage times of just a few days, such storage presents no particularly great difficulties. If, however, the energy is to be stored from summer until the next winter, for example, then problems arise.

The production of water gas has long been known and used in the manufacture of fuel gas, steam being passed over glowing coal or coke. In this operation, the steam is reduced in an endothermic process, and a gaseous mixture composed of substantially equal parts of CO and $H_2$ is produced.

It is an object of this invention to provide an improved method and apparatus which make it possible to produce, with the aid of solar energy, a combustible gaseous mixture which can be stored as long as may be desired.

To this end, in the method according to the present invention, the improvement comprises the steps of disposing the carbon in a chamber having at least one window permeable to solar radiation, introducing water into the chamber, and causing a portion of the surface of the carbon to be irradiated through the window and the water by concentrated solar radiation for the purpose of heating that surface portion, thereby causing formation of a cloud of steam in the vicinity of the irradiated carbon surface, with consequent production of the gaseous fuel.

In the apparatus according to the present invention, the improvement comprises at least one wall portion which is permeable to solar radiation and forms part of the chamber, holding means for holding the piece of carbon at a location opposite the radiation-permeable wall portion, means for focusing solar radiation upon at least part of the carbon through this wall portion, an inlet for supplying water to the chamber, and an outlet for carrying off the gaseous fuel from the chamber.

Figure 2:
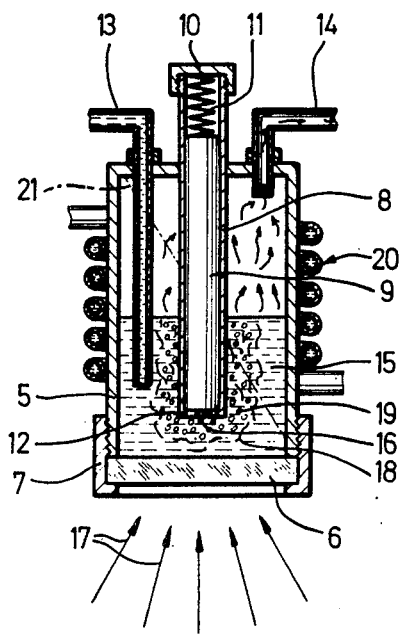
Figure 3:
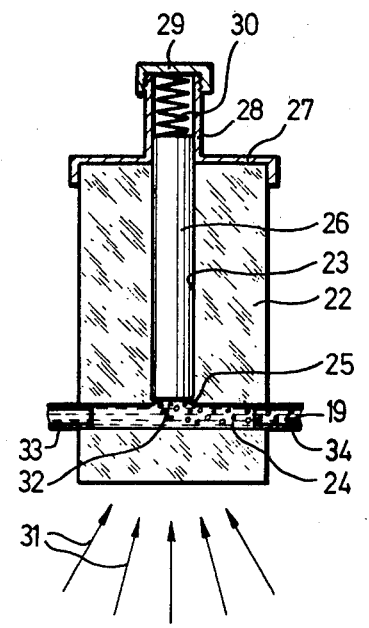
Figure 4:
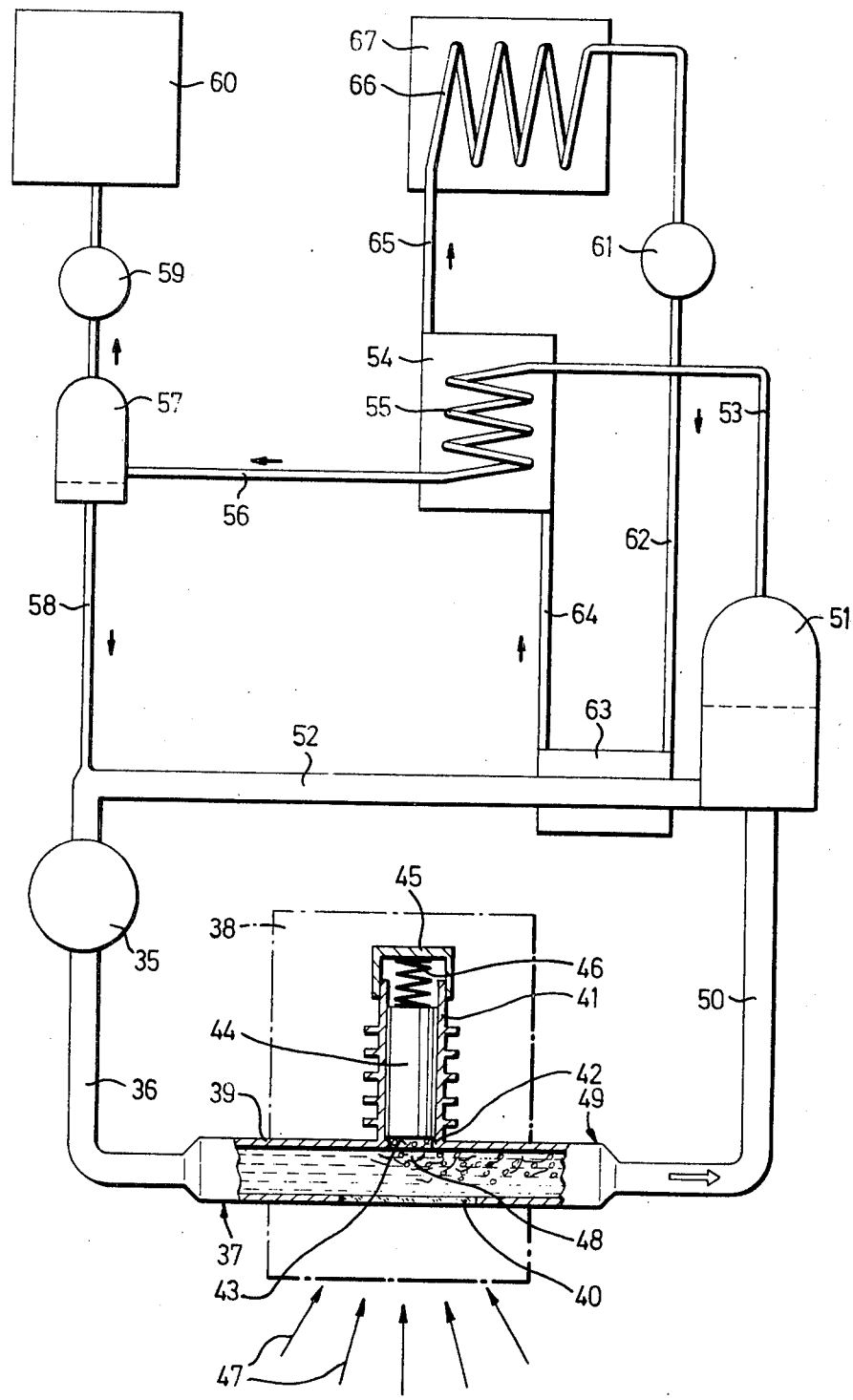

Preferred embodiments of the invention will now be described in detail with reference to the accompanying drawings, in which:

FIG. 1 is an elevation, partially in section, of a parabolic reflector which focuses the captured sunrays upon part of the apparatus according to the invention, FIG. 2 is a section through an embodiment of the apparatus according to the invention, FIG. 3 is a section through a second embodiment of the apparatus according to the invention, and FIG. 4 is a diagrammatic elevation, partially in section, of an installation for short- and long-term storage of solar energy, including apparatus according to the invention.

A reflector 1 illustrated in FIG. 1 is a parabolic reflector which is pivotingly and tiltingly disposed on a column 2 and provided with sun-tracking means (not shown). Disposed at the focal point of reflector 1 is a device 3, to be described in more detail with reference to FIG. 2, which device is rigidly connected to reflector 1 by supports 4.

FIG. 2 shows a simple embodiment of device 3 in section. It comprises a cup-shaped container 5 of metal, a bottom aperture of which is closed by a solar-radiation-permeable pane 6, preferably of quartz glass. Pane 6 is held in place by a screw cap 7 screwed onto container 5. A pipe 8 extending into container 5 is concentrically disposed with respect thereto and rigidly connected thereto. Within pipe 8 a carbon rod 9 is displaceably disposed, and on the other end of pipe 8 is a cap 10. Disposed between cap 10 and the upper end of carbon rod 9 is a compression spring 11 which presses rod 9 toward pane 6. In order to keep rod 9 from moving all the way down to pane 6, the edge 12 of the inner end of pipe 8 is slightly beaded over inwardly. Opening into container 5 is a supply line 13 for supplying water to container 5, while an outlet line 14 is provided for carrying off a gaseous mixture produced during the operation to be described below.

It shall now be assumed that it is noon and that reflector 1 is aimed at the sun at its zenith, container 5 being in the position shown in FIG. 2. Through supply line 13, enough water is supplied to container 5 to submerge the inner end of pipe 8 with the end face 16 of carbon rod 9.

Sunrays 17 reflected by reflector 1 pass through pane 6 and water 15 and are focused upon end face 16 of carbon rod 9. The solar radiation incident upon the entire reflecting surface of reflector 1 is concentrated upon end face 16 of carbon rod 9, so that the portion of rod 9 exposed to this focused radiation is heated to a temperature of at least 1000° C, preferably from 1200–1500° C. Owing to the great heat in the vicinity of end face 16, water 15 evaporates there and forms a cloud of steam 18 enveloping end face 16. The impingement of focused sunrays 17 upon end face 16 of rod 9 is not hindered by the cloud of steam 18. As a result of the intimate contact between steam 18 and the red-hot end face 16 of carbon rod 9, the aforementioned water gas—a mixture of CO and $H_2$—is produced. This gaseous mixture mixes with steam and forms bubbles 19 which rise through the surrounding water; the steam condenses in the water, and the mentioned gaseous mixture collects at the top of container 5 and can be conveyed to a storage facility through outlet line 14. Owing to the layer of water between pane 6 and the portion of carbon rod 9 acting as an absorber, a thermal equilibrium is created because the water acts as a heat regulator and because it also makes it possible, on account of its thermal inertia, for both the thermolysis and the subsequent water-gas reaction in the vicinity of end face 16 to proceed reliably. Inasmuch as the water and the steam are permeable to the concentrated solar radiation, the latter directly reaches the portion of rod 9 serving as an absorber. In this manner, primarily only that portion of carbon rod 9 which directly serves to produce the gaseous mixture is heated. In order to keep all the water 15 in container 5 from evaporating, i.e., except for the water in immediate proximity to end face 16, container 5 is encircled by a cooling coil 20; the heated cooling water may, for example, be used in the preparation of hot water for consumption.

During the operation described above, material is removed from the lower end of carbon rod 9. Since rod 9 is biased by spring 11, there is an automatic replacement feed so that carbon and steam are constantly present in the operative region of the apparatus.

When container 5 is in the position illustrated in FIG. 1, the water level runs along the straight dot-dash line 21. The gaseous mixture can leave container 5 unimpeded despite the inclination.

FIG. 3 illustrates a further embodiment of the apparatus according to the invention. Within a preferably cylindrical block 22 of quartz glass or quartz there is a non-continuous longitudinal channel 23 of circular cross-section and a continuous transverse channel 24 of preferably rectangular cross-section, the larger dimension of which corresponds to the diameter of longitudinal channel 23. Channel 23 opens into the middle of channel 24 and comprises at that point a slight constriction 25 which serves the same purpose as the inwardly beaded edge 12 of pipe 8 in the embodiment of FIG. 2. A carbon rod 26 is displaceably disposed within longitudinal channel 23. The top of block 22 is surrounded by a metal fitting 27 having a tubular extension 28 which serves as a prolongation of channel 23. The free end of extension 28 is closed by a cap 29. Between cap 29 and carbon rod 26 there is a compression spring 30 which presses rod 26 against constriction 25.

The sunrays 31 collected by reflector 1 are focused through the bottom of block 22 upon the lower end face 32 of rod 26, whereby the lower portion of rod 26 becomes red-hot. Through an inlet pipe 33, transverse channel 24 is supplied with water which immediately evaporates in the vicinity of the red-hot portion of carbon rod 26. Through the intimate contact of the steam with the red-hot carbon, the aforementioned water gas is produced, which leaves channel 24 together with part of the steam through an outlet pipe 34.

FIG. 4 is a simplified illustration of an installation for short- and long-term storage of solar energy, comprising apparatus according to the invention for producing water gas with the aid of solar energy. By means of a water pump 35, water is conveyed through a flexible pipeline 36 to an inlet 37 of a device 38 which which works similarly to the device shown in FIG. 3. Device 38 comprises a pipe 39 having a window 40 of quartz glass or quartz. Opposite window 40, a pipe extension 41 opens into pipe 39. At this location, pipe extension 41 has a small rim 42 projecting radially inward, against which the lower end face 43 of a carbon rod 44 rests. The other end of extension 41 is closed by a cap 45. Between cap 45 and rod 44 there is disposed a compression spring 46 which presses rod 44 against rim 42. Focused solar radiation 47 impinges upon end face 43 of rod 44 through window 40 and through the water in pipe 39, thus heating rod 44. A cloud of steam 48 forms in the vicinity of end face 43, whereby water gas is produced. A mixture of water gas, steam, and water leaves device 38 via an outlet 49 and passes through a flexible pipeline 50 to a water separator 51. The separated water is returned to water pump 35 through a pipeline 52. The gaseous mixture separated in water separator 51 contains a certain proportion of steam in addition to the water gas. This gaseous mixture passes through a pipeline 53 to a heat exchanger 54 having a cooling coil 55, in which the steam condenses. The remainder of the gaseous mixture, together with the condensed water, reaches a further water separator 57 via a pipeline 56. The condensed water is returned to pump 35 from separator 57 through a pipeline 58, while the water gas is drawn off by a gas pump 59 and pumped into a gas tank 60, where the combustible gaseous mixture can be stored as long as may be desired without any loss of energy. Water can be applied to the system illustrated into pipeline 52 via a line 70 which is connected to a water source not shown. Valve 72 can be used to stop the flow of water or allow water to enter the system when and if needed.

A coolant pump 61 supplies a coolant, which may be water, through a pipeline 62 to a cooling jacket 63 surrounding pipeline 52 for cooling the water leaving the first water separator 51, through a pipeline 64 to heat exchanger 54 for condensing the remaining steam in the gaseous mixture leaving the separator 51, through a pipeline 65, and through a heat exchanger 66 back to coolant pump 61. Heat exchanger 66 is situated within a tank 67 for the preparation and storage of hot water. Thermal energy may be stored in tank 67 for shorter periods, i.e., for a few days.

The installation illustrated in FIG. 4 demonstrates how advantageously the apparatus according to the invention can be used for producing a combustible gaseous mixture with the aid of solar radiation, and how the energy recovered from the solar energy may be stored for longer and shorter periods of time.

The gaseous mixture produced in the apparatus described above is not necessarily pure water gas. Some of the hydrogen combines with carbon so that $CH_4$ is produced in addition.

What is claimed is:

1. A method for producing a gaseous fuel of the type wherein steam is brought into contact with red-hot carbon, comprising the steps of:
   disposing a carbon piece in a chamber having at least one window permeable to solar radiation,
   introducing water into said chamber,
   covering at least a portion of the surface of said carbon with said water,
   directing concentrated solar radiation through said window in said chamber and through said water onto a portion of the surface of said carbon piece, so as to irradiate said carbon piece and heat said surface portion in contact with said water causing a formation of a cloud of steam proximate to said irradiated carbon surface, wherein said gaseous fuel is produced,
   Maintaining said water within said chamber so that said portion of the surface of said carbon is always covered by the water, and removing said gaseous fuel from said chamber.

2. The method of claim 1 further including separating said gaseous fuel from said water within said chamber and cooling water in said chamber.

3. Method of claim 1 further including causing said water to flow through said chamber, and separating said gaseous fuel from said water outside said chamber for recycle to said chamber.

4. The method of claim 1 further including continuously urging said carbon piece towards said window.

5. An apparatus for producing a gaseous fuel comprising a chamber having at least one wall portion permeable to solar radiation, a piece of carbon positioned within said chamber, means for holding said piece of carbon so that a portion of said piece of carbon is disposed opposite said radiation permeable wall portion, means for supplying water to said chamber, said water covering at least the portion of the surface of said carbon piece opposite said radiation permeable wall portion, means for focusing solar radiation through said one wall portion of said chamber and through said water within said chamber onto the surface of said carbon piece, whereby the portion of said carbon piece is heated in contact with the water forming steam which when contacting the heated carbon forms a gaseous fuel, means for maintaining said water within said chamber so that said portion of the surface of said carbon is always covered by the water, and means for removing said gaseous fuel from said chamber.

6. The apparatus of claim 5 wherein said carbon piece is a carbon rod having its axis substantially perpendicular to the surface of said one wall portion of said chamber.

7. An apparatus of claim 6 further including a body of quartz having a first channel and a second channel substantially at right angles to the first channel, said first channel passing completely through said quartz body and forming said chamber, said second channel receiving said carbon rod and opening into said first channel, and means for urging said carbon rod towards said first channel, and an end face of said carbon rod adjacent said first channel positioned to receive said solar radiation through a portion of said body and through the water in said first channel.

8. Apparatus of claim 7 further including means for removing a mixture of water, gas, steam and water from said chamber, and means for removing said water and steam from said water gas, and means for storing said water gas.

9. An apparatus of claim 8 further including means for returning water to said chamber.

* * * * *

UNITED STATES PATENT OFFICE
CERTIFICATE OF CORRECTION

Patent No. 4,149,856    Dated April 17, 1979

Inventor(s) WILLY KELLER

It is certified that error appears in the above-identified patent and that said Letters Patent are hereby corrected as shown below:

Cover page first line after "Foreign Application Priority Data"

change "59021/76" to --5021/76--

Signed and Sealed this

Twenty-fifth Day of September 1979

[SEAL]

Attest:

LUTRELLE F. PARKER

Attesting Officer    Acting Commissioner of Patents and Trademarks